(12) United States Patent
Beccue

(10) Patent No.: US 8,443,125 B2
(45) Date of Patent: May 14, 2013

(54) SINGLE PIN READ-WRITE METHOD AND INTERFACE

(75) Inventor: Stephen Mark Beccue, Thousand Oaks, CA (US)

(73) Assignee: Analog Devices, Inc., Norwood, MA (US)

(*) Notice: Subject to any disclaimer, the term of this patent is extended or adjusted under 35 U.S.C. 154(b) by 234 days.

(21) Appl. No.: 13/020,728

(22) Filed: Feb. 3, 2011

(65) Prior Publication Data

US 2011/0191512 A1    Aug. 4, 2011

Related U.S. Application Data

(60) Provisional application No. 61/301,622, filed on Feb. 4, 2010.

(51) Int. Cl.
*G06F 13/00* (2006.01)
*H04L 25/34* (2006.01)
*H04L 25/49* (2006.01)

(52) U.S. Cl.
USPC .............. 710/110; 341/50; 375/286; 375/293

(58) Field of Classification Search .................. 710/110; 375/286, 293; 341/50
See application file for complete search history.

(56) References Cited

U.S. PATENT DOCUMENTS

| | | | | |
|---|---|---|---|---|
| 3,505,644 A | * | 4/1970 | Breant | 714/810 |
| 4,860,309 A | * | 8/1989 | Costello | 375/286 |
| 5,373,202 A | * | 12/1994 | Armstrong, II | 326/58 |
| 5,612,633 A | * | 3/1997 | Kean | 326/59 |
| 8,064,534 B2 | * | 11/2011 | Chen | 375/286 |
| 2007/0024326 A1 | * | 2/2007 | Faust et al. | 327/105 |

OTHER PUBLICATIONS

Multigig MQC102 and MQC202 Production Programming, AN1115 Rev A, 12 pages, Aug. 2011, formerly available on World Wide Web site multigig.com.
Multigig MQC102B, 2.5V and 3.3V LVDS, LVCMOS, HCSL or LVPECL Crystal Oscillator with Multiplying PLL, Product Description, 13 pages, May 2011, formerly available on World Wide Web site multigig.com.

* cited by examiner

*Primary Examiner* — Paul R Myers
*Assistant Examiner* — Christopher A Daley
(74) *Attorney, Agent, or Firm* — Knobbe Martens Olson & Bear LLP

(57) ABSTRACT

A method of communicating on a single serial line between two devices is disclosed. The method includes combining a data stream and a clock to form a three-voltage level stream such that the third voltage level records the transitions of the clock while the serial data is either high or low. Either the first or the second device can send a combined stream on the line. The method further includes, in some embodiments, the second device driving the same voltage levels as those transmitted by the first device and the first device sensing current on the single serial line to determine that the second device has received data from the first device.

7 Claims, 8 Drawing Sheets

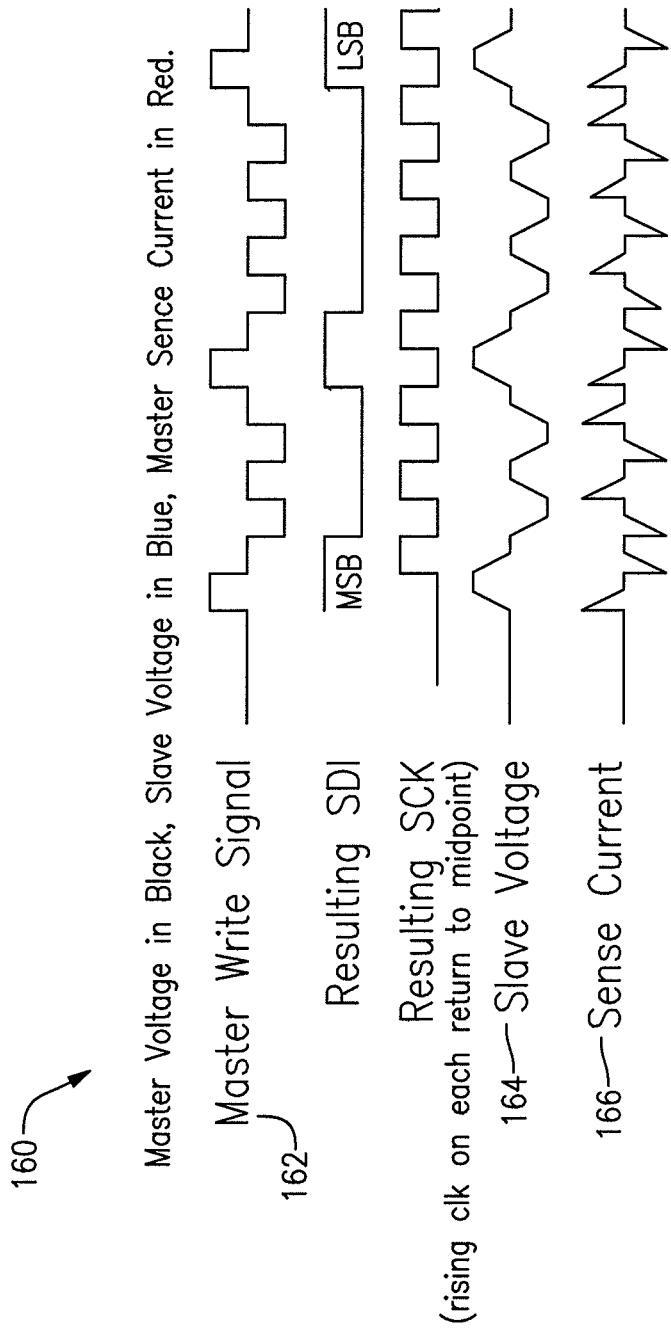

SINGLE PIN READ-WRITE METHOD AND INTERFACE

CROSS-REFERENCE TO RELATED APPLICATIONS

This application claims priority to U.S. Provisional Application 61/301,622 filed on Feb. 4, 2010 and titled "Single Pin Read-Write Method And Interface", and incorporates by reference said provisional application.

FIELD OF THE INVENTION

The present invention generally relates to serial transmission of data between devices and more particularly to a serial transmission using a single connection between a pair of devices.

DESCRIPTION OF THE RELATED ART

Prior art serial interfaces typically use two pins, one for clock and one for data or one for transmitted data and one for received data. Additionally, prior art interfaces usually have a fixed baud rate or RF encoding. The protocol for such prior art serial interfaces is usually quite complex, requiring detailed documentation and a large amount of support circuitry. There is a need for a much more simple serial interface.

BRIEF SUMMARY OF THE INVENTION

The present invention provides a simpler serial interface. At the physical level, it uses a single pin. Clock and data bits are encoded on a single net connected to the pin. In a first method, voltage only communication is used. In a second method, both voltage and current are used. At the protocol level, the present invention allows for a bus master and one or more bus slaves. Both uni-directional and bi-directional communication are possible. Additionally, each data and or clock bit can be acknowledged during the communication. Finally, the first and second methods of communication can be intermixed.

One embodiment of the present invention is a method of communication between a first device and a second device that includes the steps of forming a serial data stream, forming a serial clock, combining the serial data stream and the serial clock, transmitting the combined stream, and receiving and separating the combined stream. The first device forms the serial data stream with the data stream having first and second voltage levels for indicating a logic high and a logic low respectively. The first device forms the serial clock with the serial clock having said first and second voltage levels for indicating a logic high and a logic low respectively. The serial data stream is synchronous with the serial clock. The first device combines the serial data stream and the serial clock so that the combined stream has said first and second voltage levels and a third voltage level, the first level and the second level being present while the serial clock is low and when serial data is high and low respectively, the third level being present when the serial clock is high so that transitions of the serial clock are present in the combined stream. The first device transmits the combined stream on a line connecting the first and second devices. The second device receives the combined stream and separates the serial data stream from the serial clock by detecting said first, second, and third voltages, the first voltage indicating a logic high in the serial data stream, the second voltage indicating a logic low in the serial data stream, and the third voltage indicating transitions of the serial clock.

Another embodiment of the present invention is a method of communication between a first device and a second device that includes forming a serial data stream, forming a serial clock, combining the serial data stream and the serial clock, transmitting the combined stream, receiving the combined stream and driving the received stream onto the line, and separating the serial data stream from the serial clock. The first device forms the serial data stream with first and second voltage levels indicating a logic high and a logic low respectively. The first device forms the serial clock with the first and second voltage levels indicating a logic high and a logic low respectively. The serial data stream is synchronous with the serial clock. The first device combines the serial data stream with the serial clock so that the combined stream has the first and second voltage levels and a third voltage level, the first level and the second level being present while the serial clock is low and when serial data is high and low respectively, and the third level being present when the serial clock is high so that transitions of the serial clock are present in the combined stream. The first device transmits the combined stream on a line between the first and second devices. The second device receives the combined stream and drives the same voltage levels as those of the received combined stream onto the line between the first and second devices. The second device separates the serial data stream from the serial clock by detecting said first, second and third voltages, the first voltage indicating a logic high in the serial data stream, the second voltage indicating a logic low in the serial data stream, and the third voltage indicating transitions of the serial clock.

Yet another embodiment of the present invention is a system for communicating between a first device and a second device that includes a single wire connection between the two devices, a transmitter circuit, and a receiver circuit. The transmitter circuit resides in the first device and includes a logic circuit and a three-level driver that drives a high, low or middle voltage. The logic circuit computes when data to be transmitted is high or low when a clock is low, and when the clock is high. The driver drives a logic high when the data is high while the clock is low and a logic low when the data is low while the clock is low. The driver circuit drives the middle voltage when the clock is high. The receiver circuit resides in the second device and includes a voltage divider, a first and second comparator, and first and second flip-flops. The voltage divider provides first and second comparator voltages. The first comparator detects a logic high when the voltage on the single wire connection is above the first comparator voltage and saves detected logic high in the first flip-flop. The second comparator detects a logic low when the voltage on the single wire connection is below the second comparator voltage and saves detected logic low in the first flip-flop. The first and second comparators detects the middle voltage when the voltage on the single wire connection is between the first and second comparator voltages and transfers the detected logic high or logic low from the first to the second flip-flop.

One advantage of the present invention is that only a single pin is required. The same pin and net is used for clock, data, and communication in either direction. This permits lower pin counts on ICs that need a serial interface.

Another advantage is that the communication does not required RF encoding or a fixed baud rate to operate.

Yet another advantage is that the single pin system is simple to implement.

Yet still another advantage is that the single pin system can be used with any automatic test equipment, which is designed to be the master. Thus, the device under test need only implement the slave portion of the interface and implement the slave portion of the protocol.

BRIEF DESCRIPTION OF THE DRAWINGS

These and other features, aspects and advantages of the present invention will become better understood with regard to the following description, appended claims, and accompanying drawings where:

FIG. 5 shows voltage and current mode operation in which the master sends data to the slave which responds by driving the same signal onto the serial line.

DETAILED DESCRIPTION OF THE INVENTION

Voltage Only Method

The voltage signals have 3 (three) levels, say VDD, GND, and VDD/2, but any three distinct levels can be used. Initially, the master drives the bus, and the slave has a high-impedance state.

Figure 1:
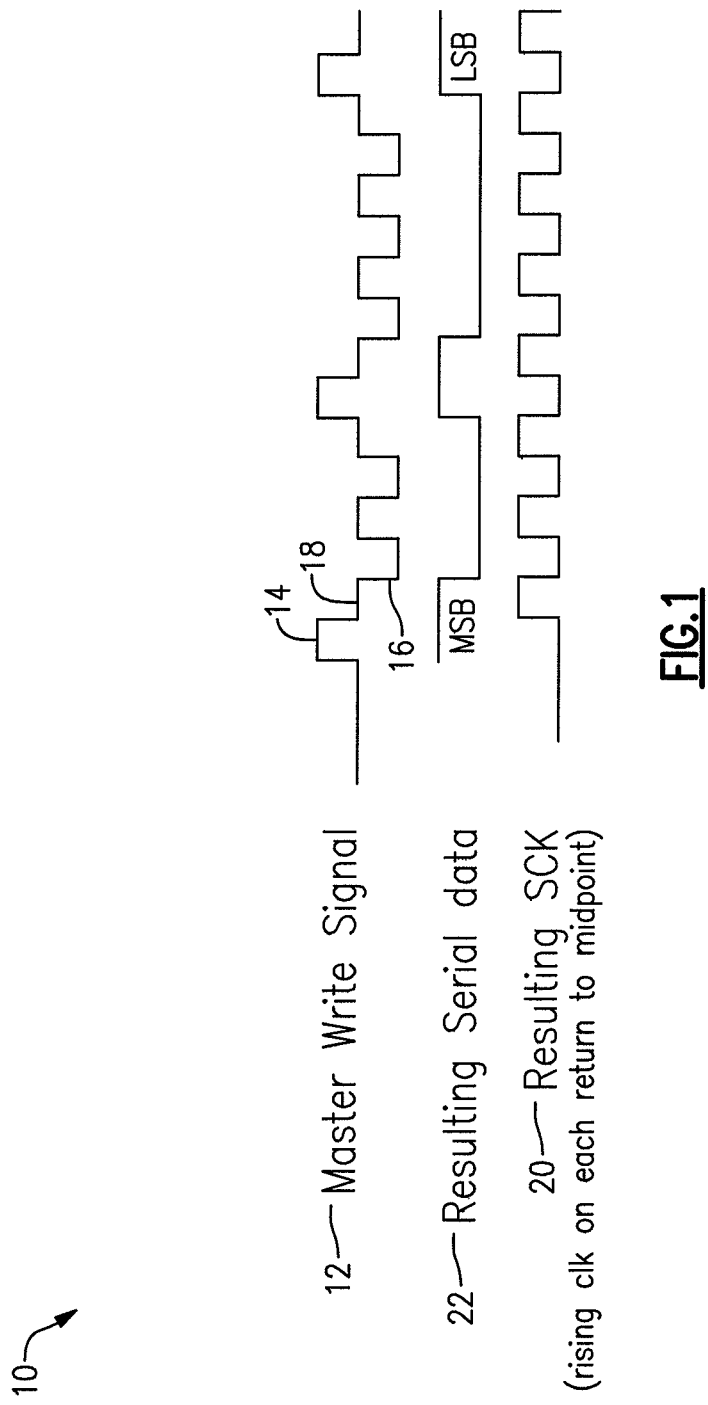
FIG. 1 shows voltage mode operation in which the master sends data to the slave.

Referring to FIG. 1, the master controls the timing and initiates any activity. In the master write signal 12, the master writes to the slave by driving to VDD 14 for a "1", and GND 16 for a "0". Slaves remain in the high-impedance state and receive the data. The transition back to the midpoint 18 serves as the serial clock (SCK) 20. When the slave drives the serial interface, it controls the timing. Thus, for both the master and the slave, the serial data 22 is VDD (1) or GND (0) and the transition to VDD/2 indicates a clock 20.

Figure 2:
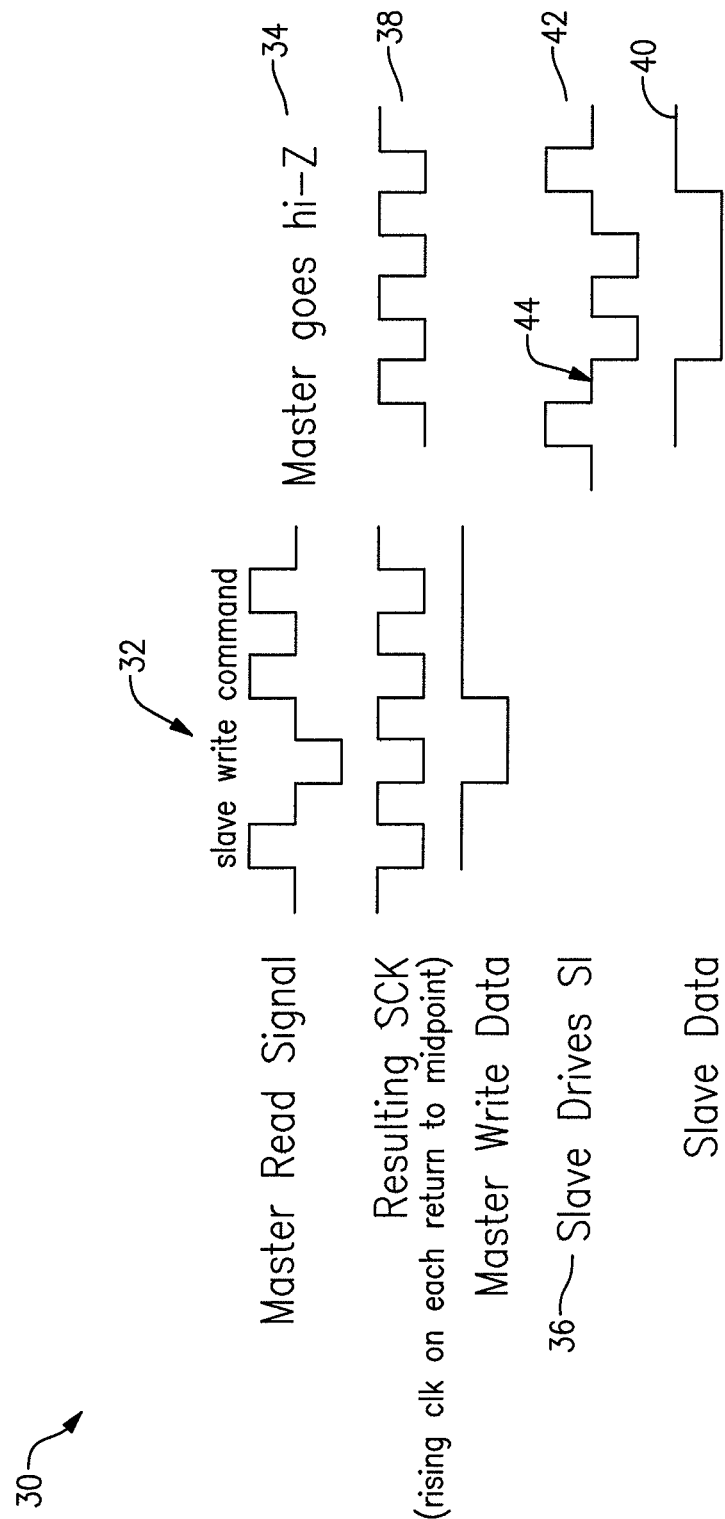
FIG. 2 shows voltage mode operation in which the master instructs the slave device to send data back to the master device.

As shown in FIG. 2, when commanded by the master, the slave drives the bus and the master assumes a high-impedance state. In FIG. 2, the master goes the high-impedance state 34 after it sends the slave write command 32 in anticipation of the slave controlling the line. The slave then drives data 34, using the same method, i.e., data 40 and clock 38 combine to create a tri-level 42 signal with transitions back to the middle voltage (VDD/2) 44 serving as the serial clock.

Figure 3:
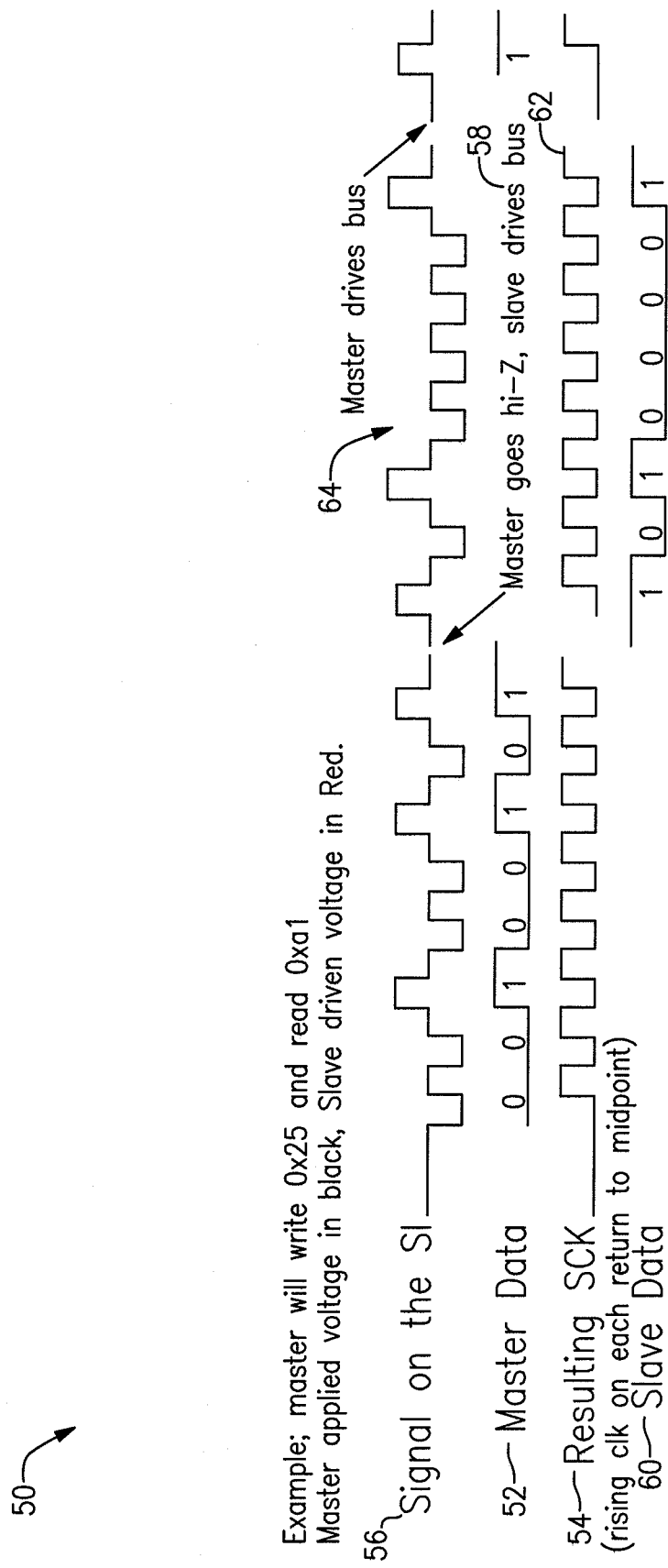
FIG. 3 shows an example of the master sending particular data to the slave and the slave sending particular data back to the device master.

FIG. 3 shows an example in which the master writes 0x25 (hexadecimal "25") to a slave and reads 0xa1 (hexadecimal "a1") from a slave. The 0x25 data 52 from the master is combined with the serial clock SCK 54 to create the tri-level 56 signal in which transitions back to the middle voltage convey the serial clock 54. The master goes then goes to the high-impedance 58 state. The 0xa1 data 60 from the slave is combined with the serial clock 62 to create the tri-level signal 64 for the master.

Voltage and Current Method

In this method, the master controls the timing and initiates any activity. The interface depends on the master and slave both being capable of driving the line to VDD, VDD/2 or GND at the same time. Also, in this method, both the master and the slave also sense the current through the interface. The master writes to the slave by driving VDD for a 1 and GND for a 0 and, again, the transition back to the midpoint serves as the serial clock (SCK).

Figure 4A:
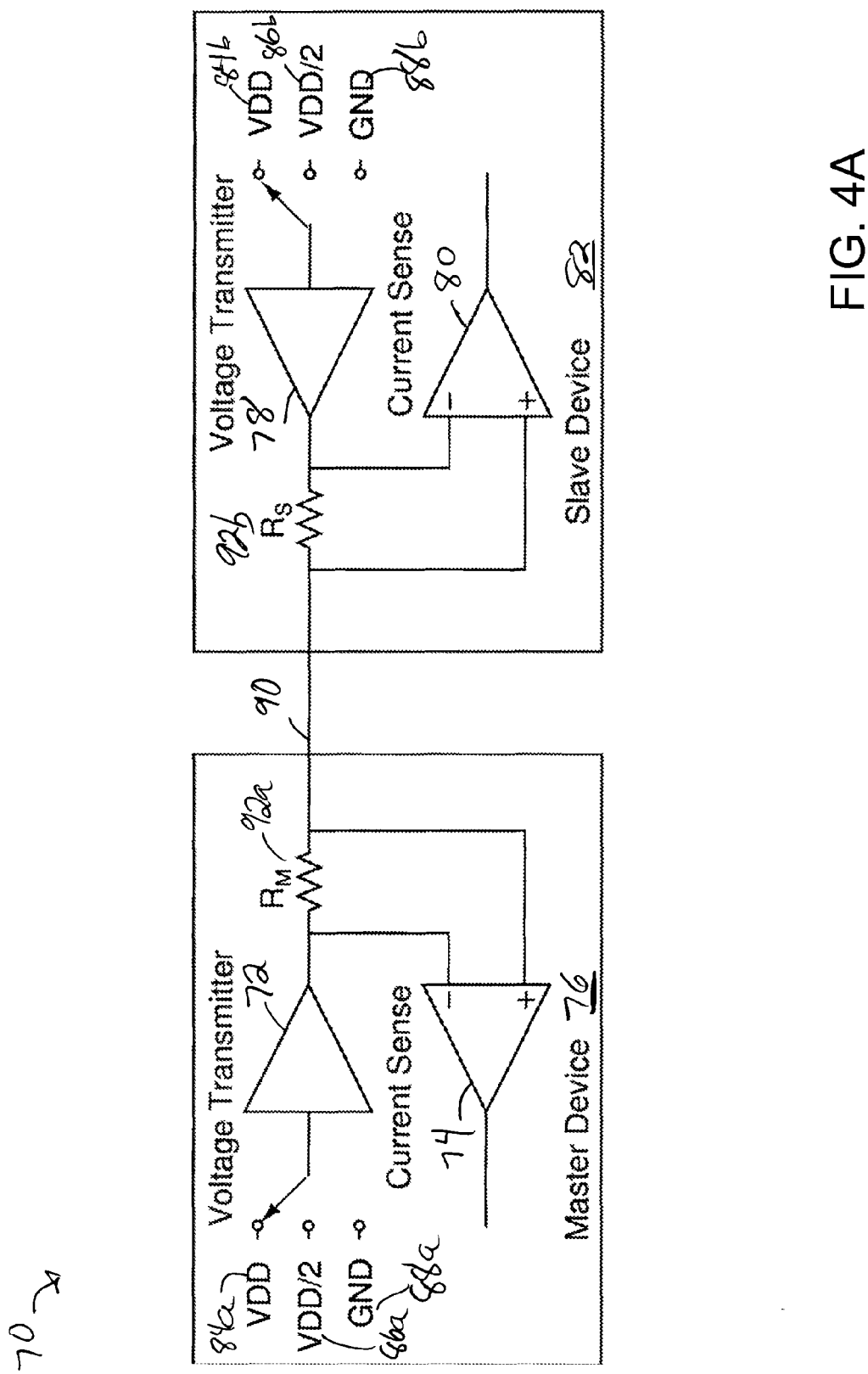
FIG. 4A shows representative voltage transmitter and current sense circuitry in the master device and similar circuitry in the slave device.

FIG. 4A shows representative voltage transmitter 72 and current sense 74 circuitry in the master device 76 and voltage transmitter 78 and current sense 80 circuitry in the slave device 82. The voltage transmitter 72 78 in either the master or the slave device has three different voltage input levels, shown as VDD 84*a,b*, VDD/2 86*a,b* and GND 88*a,b*, but any three distinct levels will do. The voltage transmitter 72 78 passes these voltage levels to the single line 90 that connects the master device 76 to the slave device 82. In the circuitry of FIG. 4A, the current sensing is performed by a resistor 92*a,b* in series with the line 90 and a current sense device 74, 80, such as a comparator or operational amplifier, connected across the resistor 92*a,b*. The series resistors Rm 92*a* and Rs 92*b* can be 50 ohms and the medium can be a transmission line, but this is not required. The current sense device 74 80 in either the master 76 or the slave device 82 senses the direction, magnitude or both of current flowing on the single line 90 between the master 76 and the slave 82. In voltage and current operation, whenever the master 76 drives to a given level, the slave 82 must do likewise. In addition, both the master 76 and the slave 82 must sense the current on the line 90.

Figure 4B:
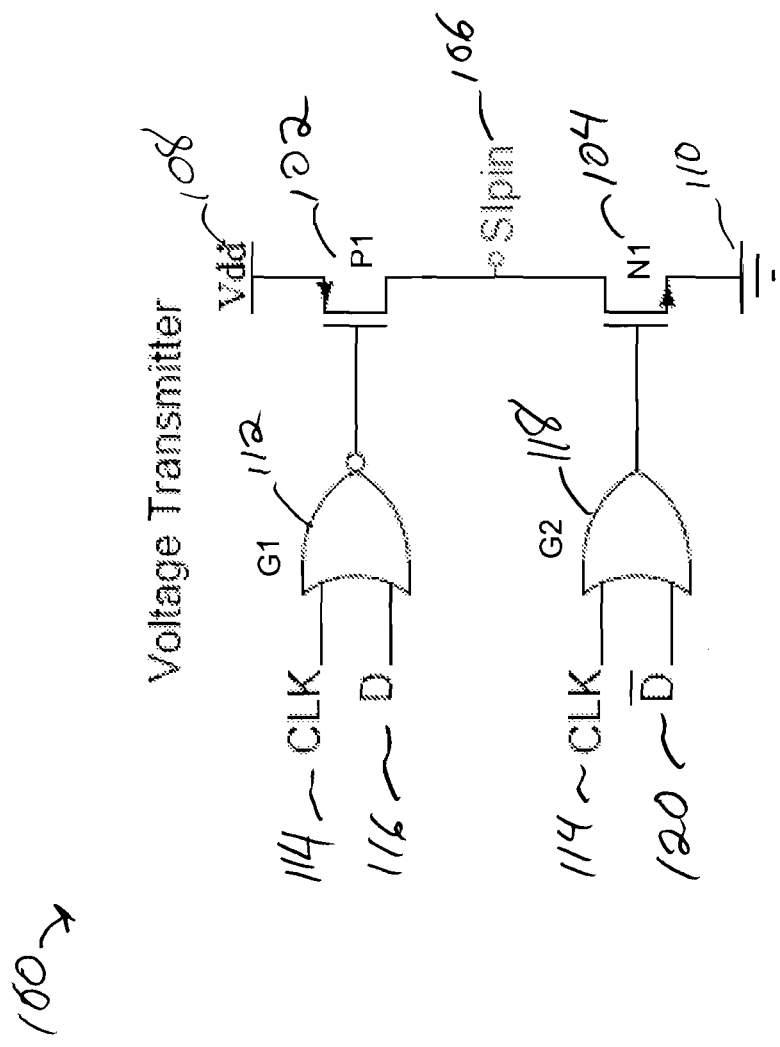
FIG. 4B shows a transmitter circuit.

FIG. 4B shows a more detailed circuit 100 for a voltage transmitter in accordance with either method of the present invention. The circuit 100 includes a PMOS P1 102 and an NMOS N1 transistor 104. The drains of the two transistors 102 104 are connected to form the output 106 of the circuit. The source of the PMOS transistor 102 is connected to VDD 108 and the source of the NMOS transistor 104 is connected to GND 110. The gate of the PMOS transistor is driven with a NOR gate G1 112 whose inputs are the serial clock (CLK) 114 and the serial stream data (D) 116. The gate of the NMOS transistor is driven with an OR gate G2 118 whose inputs are the serial clock (CLK) 114 and the inversion of the serial stream data (D̄) 120. In operation, when the CLK 114 is low, the serial stream data 116, 120 determines the state of the output. That is, when the serial stream data 116, 120 is high, the output 106 is high (VDD) and when the serial stream data is low 116, 120, the output 106 is low (GND). When the CLK 114 is high, the output 106 of the driver is (VDD−GND)/2, regardless of the state of the data stream 116, 120. This provides a clock transition in the combined data stream, which is carried on the single SIpin 106.

Figure 4C:
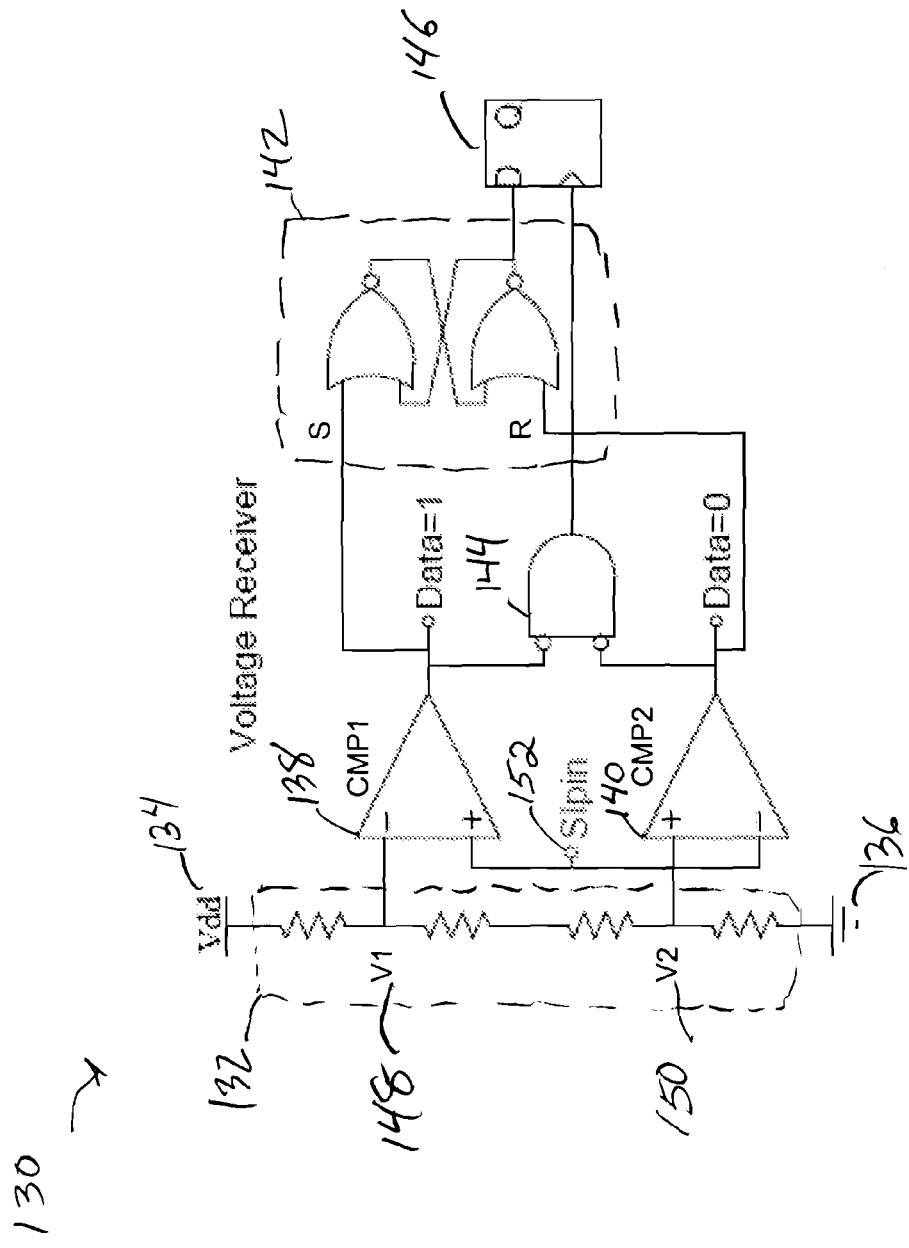
FIG. 4C shows a receiver circuit.

FIG. 4C shows a detailed circuit for a voltage receiver 130 in accordance with either method of the present invention. The circuit 130 includes a voltage divider132 between VDD 134 and GND 136, a pair of comparators CMP1 138 and CMP2 140, a SR flip-flop 142, a NOR gate 144 and a D flip-flop 146. The voltage divider 132 creates a first voltage V1 148 between VDD 134 and (VDD−GND)/2, and a second voltage V2 150 between (VDD−GND)/2 and GND 136. The first voltage V1 148 connects to the negative input of the first comparator CMP1 138 whose positive input receives the combined data stream on SIpin 152. The V2 voltage 150 connects to the positive input of the second comparator CMP2 140 whose negative input receives the combined data stream SIpin 152. The outputs of the comparators CMP1 138 and CMP2 140 operate the inputs S and R, respectively, of the SR flip-flop 142, whose output connects to the D input of the D flip-flop 146. The outputs of the comparators CMP1 138 and CMP2 140 are also connected to the inputs of the NOR gate 144 whose output provides the clock for the D flip-flop 146.

The circuit in FIG. 4C operates as follows. When the circuit 130 receives a voltage greater than V1 148, the first comparator 138 produces a logic high at its output, which sets the SR flip-flop 142. A logic high is now present at the D input of the D flip-flop 146. When the circuit 130 receives a voltage less than V2 150, the second comparator 140 produces a logic high at its output, which resets the SR flip-flop 142. A logic low is now present at the D input of the D flip-flop 146. When the circuit receives a voltage between V1 148 and V2 150, both comparators 138 140 produce a logic low at their outputs. This enables the NOR gate 144 to clock the D flip-flop 146 with the data present in the SR flip-flop 142. Thus, the transition from a high or a low to a voltage between V1 148 and V2 150 recovers the serial clock and captures the data.

FIG. 5 shows an example of the voltage and current method. As mentioned above, the slave must drive with the slave voltage 164 its pin at the same time to the same level as the master in master write signal 162. The slopes shown in the figure are arbitrary—they are not intended to convey anything. The driver circuit senses the current 166 on the line to see if the slave has received the driver's transmitted level, thus acknowledging each bit. The current sense allows the transmission to go as quickly as possible, since acknowledgement of a bit happens immediately. This allows the method to achieve maximum baud rate for a given transmission medium and master and slave.

Figure 6:
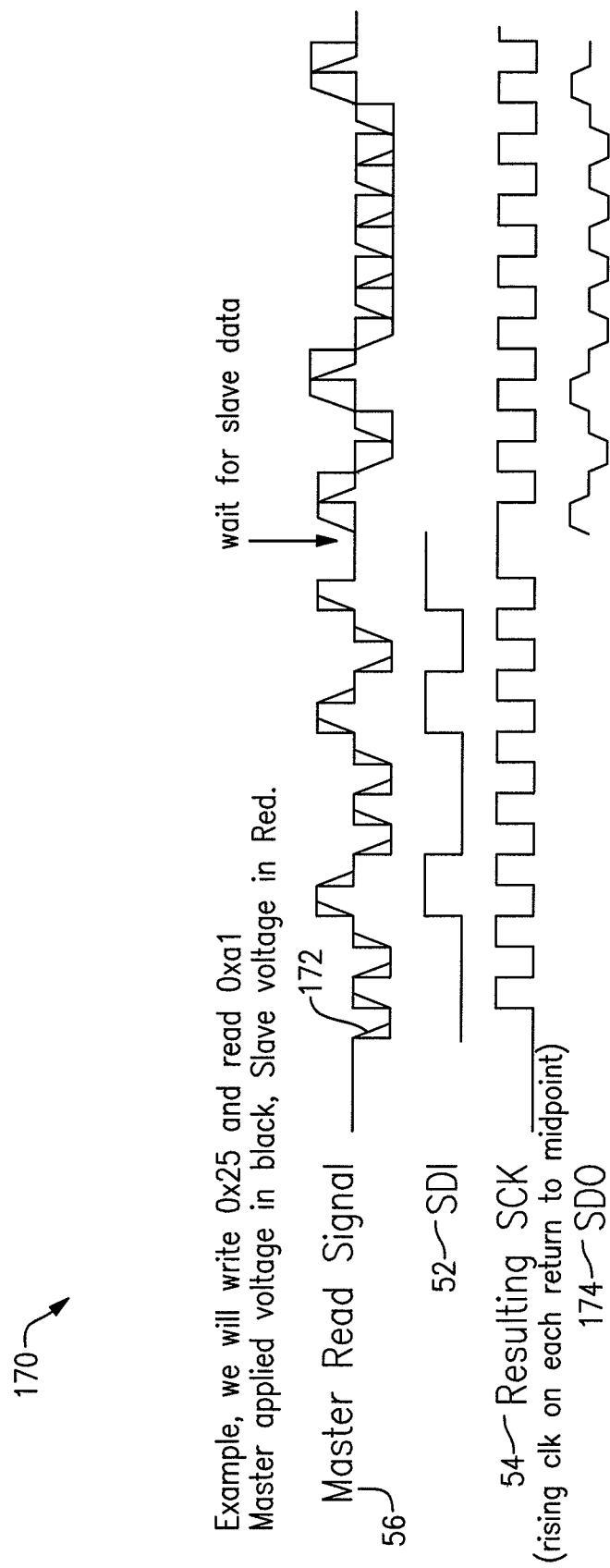
FIG. 6 shows voltage and current mode operation for the same data as that in FIG. 3.

FIG. 6 shows the data communication as in FIG. 3, except according to the second method. Again, the master writes hex "25" to the slave, while the slave acknowledges by driving on 172 the same voltage as the master. The slave sends hex "a1" 174 to the master, while the master acknowledges by driving the same voltage as the slave. The current sense serves as a receiver signal for the listening device, and as an acknowledgment for the transmitting device. Although conventional voltage comparators 72 78 in FIG. 4A may be used to receive the voltage signals, the current sense 74 80 in FIG. 4A may be used both as a signal receiver (listener) and bit acknowledgment (sender). The current sense circuitry may be used in both methods, the voltage comparator only in the voltage-only method.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method of communication between a first device and a second device, said method comprising:
   forming a serial data stream in the first device, said serial data stream having first and second voltage levels for indicating a logic high and a logic low respectively;
   forming a serial clock in the first device, said serial clock having said first and second voltage levels for indicating a logic high and a logic low respectively, said serial data stream being synchronous with said serial clock;
   combining in the first device the serial data stream and the serial clock so that the combined stream has said first and second voltage levels and a third voltage level, said first level and said second level being present while the serial clock is low and when serial data is high and low respectively, said third level being present when the serial clock is high so that transitions of the serial clock are present in the combined stream;
   transmitting the combined stream on a line connecting the first and second devices; and
   receiving in the second device said combined stream and separating the serial data stream from the serial clock by detecting said first, second, and third voltages, said first voltage indicating a logic high in the serial data stream, said second voltage indicating a logic low in the serial data stream, and said third voltage indicating transitions of the serial clock.

2. A method of communication as recited in claim 1, wherein said first voltage is VDD, said second voltage is GND and said third voltage is (VDD−GND)/2.

3. A method of communication as recited in claim 1, wherein first device is a master device and second device is a slave device.

4. A method of communication as recited in claim 3, further comprising the steps of:
   sending a command to the slave device instructing the slave device to send data back to the master device;
   presenting a high-impedance state on the line waiting for the slave device to respond to the command;
   receiving a three voltage level stream from the slave device, the three-voltage level stream including a slave serial data stream and a slave serial clock; and
   separating the three-voltage level stream sent by the slave device from the serial clock sent by the slave device, a first voltage indicating a logic high in the slave serial data stream, a second voltage indicating a logic low in the slave serial data stream, and a third voltage indicating transitions of the slave serial clock.

5. A method of communication between a first device and a second device, said method comprising:
   forming a serial data stream in the first device, said serial data stream having first and second voltage levels for indicating a logic high and a logic low respectively;
   forming a serial clock in the first device, said serial clock having said first and second voltage levels for indicating a logic high and a logic low respectively, said serial data stream being synchronous with said serial clock;
   combining in the first device the serial data stream and the serial clock so that the combined stream has said first and second voltage levels and a third voltage level, said first level and said second level being present while the serial clock is low and when serial data is high and low respectively, said third level being present when the serial clock is high so that transitions of the serial clock are present in the combined stream;
   transmitting the combined stream on a line between the first and second devices;
   receiving in the second device said combined stream and driving the same voltage levels as those of the received combined stream onto the line between the first and second devices; and
   separating the serial data stream from the serial clock by detecting said first, second and third voltages, said first voltage indicating a logic high in the serial data stream, said second voltage indicating a logic low in the serial data stream, and said third voltage indicating transitions of the serial clock.

6. A method of communication as recited in claim 5, further comprising sensing current changes on the line between the second device and the first device to determine that the second device received the combined stream.

7. A system for communicating between a first device and a second device, said system comprising:
   a single wire connection between the first and second devices;

a transmitter circuit residing in the first device,
- said transmitter including a logic circuit and a three-level driver that drives a high, low or middle voltage,
- said logic circuit computing when data to be transmitted is high or low when a clock is low, and when the clock is high,
- said driver driving a logic high when the data is high while the clock is low and a logic low when the data is low while the clock is low,
- said driver driving the middle voltage when the clock is high; and a receiver circuit residing in the second device,
- said receiver including a voltage divider, a first and second comparator, and first and second flip-flops,
- said voltage divider providing first and second comparator voltages,
- said first comparator detecting a logic high when the voltage on the single wire connection is above the first comparator voltage and saving detected logic high in the first flip-flop,
- said second comparator detecting a logic low when the voltage on the single wire connection is below the second comparator voltage and saving detected logic low in the first flip-flop,
- said first and second comparators detecting the middle voltage when the voltage on the single wire connection is between the first and second comparator voltages and transferring the detected logic high or logic low from the first to the second flip-flop.

\* \* \* \* \*